Patented Nov. 24, 1953

2,660,537

UNITED STATES PATENT OFFICE 2,660,537

BONDED REFRACTORY AND ITS MANUFACTURE

Howard F. West and John H. Veale, Joliet, Ill., assignors to Illinois Clay Products Company, Joliet, Ill., a corporation of Illinois No Drawing. Application February 23, 1950, Serial No. 145,912

2 Claims. (Cl. 106—68)

This invention relates to refractories containing silica, and among other objects aims to provide at a relatively low cost an improved refractory which utilizes certain advantageous properties of silica.

The invention is characterized by bonding silica and clay minerals by means of a bond developed at relatively low temperatures by the reaction between the clay minerals and sulphuric acid. The expressions "clay minerals" or "hydrated alumina materials" will be employed for convenience to define the complex hydrated aluminum silicates and hydrated aluminas which characterize and give to clays their unique properties. As is well known, the silica to alumina ratio in clays varies, as does the amount and nature of other constituents, such as free silica, alkalis, oxides of iron, calcium and magnesium, sulphur and organic impurities which affect the fusion point and other properties of the clay. The principal hydrated aluminum silicates are kaolinite, illite, and montmorillonite, and numerous variants thereof. Kaolinite or its variants occur in many fire clays wherein the alumina to silica ratio may vary from about 60 to 40% silica and 25 to 50% alumina. Examples of other hydrated alumina materials are diaspore, bauxite and gibbsite. These are well known refractories having a high alumina content (e. g. 50 to 70%) and low plasticity. They may be employed in place of some or all of the more plastic clay minerals. From the various clay minerals and aluminous materials it is possible to vary the properties of the bonding agent to suit service conditions.

Bonded silica refractories are important because of their strength and substantial absence of deformation at high temperatures. Deformation does not occur until very close to their melting point.

The nature of the invention may be readily understood by reference to one illustrative product and its method of manufacture, hereinafter described. The invention will be described in connection with the manufacture of brick refractories, but it will be understood that it embraces refractories of other shapes, whether molded by conventional forming apparatus or formed in situ.

The conventional silica fire brick heretofore available comprised grains of ganister (crushed quartz rock) bonded with about 3% lime. Additional mechanical bond was provided by the irregular and sharp-cornered grains of the ganister. The high firing temperatures (about 2600° F.) necessary to develop the lime silica bond are in part responsible for the high cost of the conventional silica brick.

In the illustrative brick, silica (in the form of silica sand) together with clay minerals, e. g. fire clay, are bonded by the reaction between sulphuric acid and the aluminous constituents of the clay minerals to develop what we believe is an acid aluminum sulphate bond which may be defined by the general formula $$Al_2(SO_4) \cdot XH_2SO_4 \cdot YH_2O$$

X may vary from 1 to 5, and Y probably does not exceed 10. While other aluminum compounds may be used in the reaction, we prefer to use clay minerals (e. g. fire clay) because they are inexpensive and generally available and, to the extent of their plasticity, they improve the working and forming characteristics of the mixture.

One illustrative brick may comprise about 40% silica sand, 3% concentrated sulphuric acid and the balance fire clay. One illustrative type of such clay comprises 19 to 25% alumina and 60 to 75% silica. The amount of silica sand may vary considerably from a small amount to practically all silica sand except for the clay necessary to provide the aluminum constituents in the bond. In practice the silica content in the brick generally varies from 60 to 85%. In clays having a high clay mineral content (e. g.. 80–85% clay mineral) the clay content required for developing a bond may be as low as 15%. In most fire clays, however, there is a substantial amount of free silica, and the clay mineral content is therefore much lower. Many common forms of fire clay contain as much as 50% free silica, not including the silica combined with the alumina. Since silica and aluminous materials with high alumina content have low plasticity, the proportion of silica and the character of the clay mineral used to supply the bond forming constituent, should preferably be adjusted to the melting point desired in the completed article. Thus silica and more plastic (though less refractory) clays provide an easier working mixture.

The amount of acid generally varies with the amount of clay mineral, preferably from 2 to 5%, and with the amount of fine particles in the clay. A larger amount of acid is necessary if the clay contain a large proportion of very fine particle sizes. Commercial concentrated sulphuric acid (66 Bé.) containing about 2 to 5% water may be employed. Water is not required unless it be necessary to secure a desired working consistency in any given case. Excess water should be avoided since most of it must eventually be driven off to develop maximum strength. Some water is formed in the reaction, thus:

$$Al_2O_3 + 4H_2SO_4 \rightarrow Al_2(SO_4)_3 \cdot H_2SO_4 \cdot 3H_2O$$

In cases where it is desirable to increase the fusion point aluminous materials having a higher alumina content than common fire clays may be used. Diaspore, bauxite and gibbsite are examples of such materials. Whereas the more refractory fire clays have an alumina content of 45 to 56%, diaspore, bauxite and gibbsite have alumina contents ranging up to 71%.

The total alumina content of the aluminous material used to supply the bonding constituent determines the amount of acid required to react to form the bonding material. Mixtures of clay and the so-called higher alumina materials in various proportions may be employed where the maximum melting point is not necessary.

In mixing the constituents together, the acid is preferably added to the non-plastic silica and thoroughly mixed therewith before mixture with the clay. This avoids agglomeration or balling up of the clay and interference with easy and thorough distribution of the clay throughout the silica.

After thorough mixing of the several ingredients to secure uniform distribution throughout the mass, the material is molded by pressing, extrusion or formation in situ. Full strength is not developed until substantially all free water is driven off. This does not require high temperatures although heat probably promotes reaction and facilitates the removal of excess or uncombined water. Temperatures of 250° F. are satisfactory. Upon completion of the reaction, the strength obtained (in dry pressed brick, for example) is substantially in excess of all requirements. Resistance to water is a characteristic of the acid aluminum sulphate bond (as contrasted with aluminum sulphate) and indicates generally the extent of formation of acid aluminum sulphate as compared with aluminum sulphate. In other words, moisture resistance increases with strength.

Since firing is not necessary to develop the bond, distortion, shrinkage or other change in size is eliminated and the molded articles are therefore absolutely uniform in size and shape. They may be laid up in a wall or other structure without substantial crevices between the brick. Mortar, which creates vulnerable areas in refractory structures but has heretofore been necessary to close joints and otherwise compensate for variations in dimensions, can therefore be minimized.

Full advantage can therefore be taken of the expansion of silica under heat. When heated in use and at relatively low temperatures (about 1000° F.) but substantially above the temperatures to which the brick has been subjected in fabrication, the silica is converted from alpha to beta form with an attendant expansion of about 5%. This is sufficient to make the joints between the brick very tight. Due to the lack of uniformity heretofore and the impossibility of laying up the brick with close joints, the expansion of the silica under heat could not be fully utilized. With the present brick, the tightening of the already close joints on expansion of the silica, makes practically a monolithic structure.

As stated above, the amount of acid necessary to develop sufficient acid aluminum sulphate to secure adequate bonding strength varies in general with the fineness of the particles of clay, i. e., with the aggregate surface area of the clay particles. For example, only 3 to 4% of acid is required for a clay having the following screen analysis:

| | Per cent |
|---|---|
| Minus 4 plus 20 mesh | 50 |
| Minus 20 plus 65 mesh | 15 |
| Minus 65 mesh | 35 | whereas about 9% acid is required to secure the same strength with finer clay; e. g., 80% through 100 mesh.

The foregoing seems to apply regardless of the type of clay mineral employed. Generally kaolins (comprising the clay mineral kaolinite) are coarser than montmorillonite and are preferred where it is desirable to minimize the amount of acid required. Ignoring particle size, any of the common clay minerals; kaolinite, montmorillonite, illite and their variants, react equally well to provide a strong bond. Maximum strength with a minimum amount of acid can be obtained with clay aggregates if the particle sizes be graded for minimum porosity. If the clay particles be relatively weak, coarse sizes (4 mesh and larger) should be avoided where maximum strength is required. Limitation of maximum aggregate sizes does not apply where the aggregate bonded is adequately strong; nevertheless for maximum strength the aggregate sizes should be graded to secure minimum porosity. Ordinary silica sand with rounded grains such as Ottawa sand, is advantageous. Ottawa sand has a screen analysis approximately

| | Per cent |
|---|---|
| Minus 20 mesh | 100 |
| Plus 30 mesh | 50 |
| Plus 100 mesh | 100 |

The invention is not limited to any particular silica sand nor to any particular screen analysis, but preferably the silica should not contain an excessive amount of fines. Coarser sizes are not objectionable, except as larger amounts of coarse sizes make the clay sand mixture more difficult to work.

For convenience in distinguishing the illustrative brick from the conventional silica brick, the former might be called a semi-silica brick, although in some cases the percent of silica may be substantially more than half the content.

As indicated above, the illustrative brick has many uses for which the conventional silica brick is not adapted, yet it possesses the high resistance to deformation which characterizes the conventional silica brick. It maintains its shape until almost to the fusion point.

In the event the brick be exposed to high surface temperatures, the silica may gradually be changed to cristobalite, which is a very stable form of silica.

In addition, the illustrative brick shows a surprising and unexpected spalling resistance as compared with the conventional silica brick made with ganister, i. e., crushed quartz. Our present theory is that the generally rounded and regular sand grains (which it is possible to use in our brick due to the much stronger bond obtained with acid aluminum sulphate) have much less surface contact than do the grains of ganister. As the surface exposed to heat expands the more or less point bonding contact of the sand grains permits slight relative movement without shearing of the bond, whereas in the conventional silica brick the large bonded areas between the flat contacting surfaces of the grains of ganister prevents movement under expansion with the result that very high internal shearing strength is developed and completely breaks the bond, thereby causing pieces to spall off.

The use of excess acid is immediately revealed in reduction of strength of the bonded material. Apparently no more than 5 molecules of acid will combine with $Al_2O_3$, thus:

$$Al_2(SO_4)_3 \cdot 5H_2SO_4 \cdot YH_2O$$

Excess acid is present as free acid and weakens the bond. Free acid may be present even though a substantial amount of the clay be unreacted. Apparently this results because the film of acid aluminum sulphate around a clay particle is relatively impervious and prevents the acid from reaching and reacting with the interior of the particle. In other words, the acid aluminum sulphate is advantageously formed only on the surfaces of the clay particles, where it can react efficiently as a bonding agent. It is likely therefore that no more bonding agent than can function efficiently as such, is formed, excess acid being present simply as free acid. A deficiency of acid, on the other hand, probably limits a portion of the reaction to the formation of aluminum sulphate, instead of continuing the reaction to form acid aluminum sulphate. Aluminum sulphate, while functioning as a relatively poor bonding agent, is not moisture resistant, and is therefore unsatisfactory.

Strength can be greatly increased, of course, by the use of pressure in forming the brick or other articles, since it increases the intimacy of contact essential for a strong bond. Any manipulation of the material which improves intimacy of contact is beneficial as regards strength.

It will be apparent from the foregoing that the properties of the refractory may be adjusted to service conditions; they are not dependent on the peculiarities of a given deposit of clay. In other words, the type and relative proportions of hydrated aluminous materials for forming the chemical bond, and the ratio thereof to the free silica, are determined by service conditions. For service temperatures of 2600 to 2900° F. a high alumina material such as diaspore may be selected, including enough fire clay, if needed, to facilitate molding and to provide a green bond during development of the acid aluminum sulphate bond. At 2600° F. and higher the diaspore will slowly develop a ceramic bond. Less refractory clay minerals (which will develop a ceramic bond at lower temperatures) are used for lower service temperatures. Similarly, the ratio of clay mineral to silica is adjusted. Thus the horizon of use is considerably extended and made independent of the peculiarities of a given clay.

This application is a continuation-in-part of our co-pending application Serial 93,195.

Obviously the invention is not limited to the details of the illustrative product and its method of manufacture, since these may be variously modified. Moreover, it is not indispensable that all features of the invention be used conjointly since various features may be used to advantage in different combinations and sub-combinations.

Having described our invention, we claim:

1. The method of making unfired silica brick which comprises mixing granular silica and concentrated sulphuric acid so as thoroughly to distribute the acid throughout the grains of silica, and then mixing the same with a quantity of clay, the ratio of the several constituents being 60 to 85% silica, 40 to 15% clay and 2 to 9% on the amount of clay of concentrated sulphuric acid, forming the mixture, and then heating the formed articles at temperatures substantially above 212° F. to form acid aluminum sulphate bonds and maintaining the temperature below the decomposition temperature of said sulphate bonds.

2. An unfired silica brick consisting essentially of a mixture of about 40 to 85% silica sand and the balance a fire clay containing at least 50% hydrated aluminum silicate, said silica sand being bonded by acid aluminum sulphate formed by the reaction between the clay and concentrated sulphuric acid in an amount of 2 to 5% of the hydrated aluminum silicate.

HOWARD F. WEST.
JOHN H. VEALE.

References Cited in the file of this patent

UNITED STATES PATENTS

| Number | Name | Date |
|---|---|---|
| 259,532 | Gurney | June 13, 1882 |
| 267,755 | Moffitt | Nov. 21, 1882 |
| 1,661,476 | Haswell | Mar. 6, 1928 |
| 1,983,589 | Anderson | Dec. 11, 1934 |
| 2,170,254 | Seil | Aug. 22, 1939 |

FOREIGN PATENTS

| Number | Country | Date |
|---|---|---|
| 233,907 | Great Britain | 1925 |